United States Patent
Ura

(10) Patent No.: US 8,219,277 B2
(45) Date of Patent: Jul. 10, 2012

(54) ELECTRIC POWER STEERING APPARATUS

(75) Inventor: Noritake Ura, Anjo (JP)

(73) Assignee: JTEKT Corporation, Osaka (JP)

( * ) Notice: Subject to any disclaimer, the term of this patent is extended or adjusted under 35 U.S.C. 154(b) by 423 days.

(21) Appl. No.: 12/585,665

(22) Filed: Sep. 21, 2009

(65) Prior Publication Data

US 2010/0082200 A1    Apr. 1, 2010

(30) Foreign Application Priority Data

Sep. 26, 2008    (JP) .................. 2008-248238

(51) Int. Cl.
  *G01M 17/00* (2006.01)
(52) U.S. Cl. .......... 701/29.7; 701/41; 340/438; 340/901
(58) Field of Classification Search .................. 701/29.7, 701/30.9, 41, 42; 340/425.5, 438, 901
See application file for complete search history.

(56) References Cited

U.S. PATENT DOCUMENTS

| | | | |
|---|---|---|---|
| 4,660,671 A | | 4/1987 | Behr et al. |
| 4,972,320 A | | 11/1990 | Sugiura et al. |
| 2002/0124663 A1 * | | 9/2002 | Tokumoto et al. ....... 73/862.333 |

FOREIGN PATENT DOCUMENTS

| | | |
|---|---|---|
| EP | 0 338 559 A2 | 10/1989 |
| EP | 1 197 725 A2 | 4/2002 |
| EP | 1 288 105 A2 | 3/2003 |
| JP | A-2000-185657 | 7/2000 |
| JP | A-2003-149062 | 5/2003 |

OTHER PUBLICATIONS

Extended European Search Report dated Sep. 8, 2010 issued in European Patent Application No. 09170961.8.

* cited by examiner

*Primary Examiner* — Gertrude Arthur Jeanglaude

(74) *Attorney, Agent, or Firm* — Oliff & Berridge, PLC

(57) ABSTRACT

When a failed Hall IC cannot be identified through determination as to whether any of output voltages falls outside a predetermined output range and determination as to whether any of the output voltages has steeply varied, a microcomputer determines whether the directions of steering torques converted from the output voltages are the same. Then, when the directions of the converted steering torques are the same, the average of these output voltages is used to calculate a temporary torque, and then power assist control is continued, that is, specifically, assisting force applied to a steering system is slowly and gradually decreased, on the basis of the temporary torque.

3 Claims, 6 Drawing Sheets

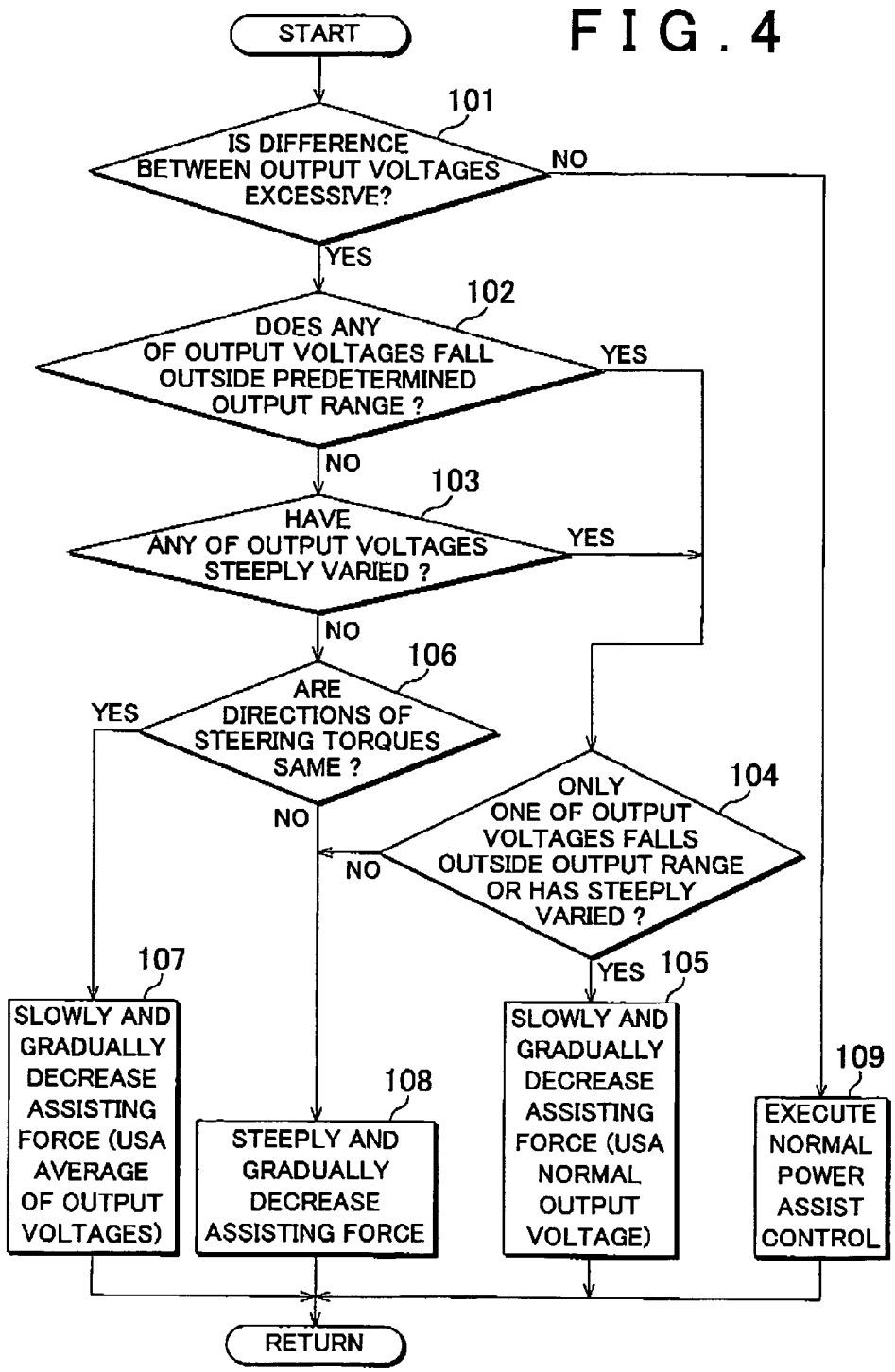

ELECTRIC POWER STEERING APPARATUS

INCORPORATION BY REFERENCE

The disclosure of Japanese Patent Application No. 2008-248238 filed on Sep. 26, 2008 including the specification, drawings and abstract, is incorporated herein by reference in its entirety.

BACKGROUND OF THE INVENTION

1. Field of the Invention

The invention relates to an electric power steering apparatus.

2. Description of the Related Art

An electric power steering apparatus (EPS) is equipped with a torque sensor that detects a steering torque transmitted via a steering shaft. The EPS applies assisting force to a steering system on the basis of the steering torque detected by the torque sensor.

Some of the above torque sensors for EPS are formed of a sensor element, such as a Hall integrated circuit (IC), of which the output level (output voltage) varies on the basis of the torsional angle of a torsion bar provided for the steering shaft. Then, for example, the torque sensor described in Japanese Patent Application Publication No. 2003-149062 (JP-A-2003-149062) includes dual Hall IC to improve reliability.

Independent two sensor signals are used to make it possible to easily and accurately determine whether the torque sensor is in failure. Specifically, for example, as shown in FIG. 5A and FIG. 5B, the torque sensor is set so that the output characteristics of the two sensor elements are inverse from each other, that is, signal waveforms (variation characteristics of output voltages Va and Vb) output for variations in steering torque are inverse from each other. Then, the total value Vab of the output voltages Va and Vb is monitored to determine whether the sensor elements of the torque sensor are in failure.

That is, unless at least one of the two sensor elements is in failure of some kind, as shown in FIG. 5C, the total value Vab of the output voltages Va and Vb of these sensor elements should be substantially constant at a predetermined voltage V2 that corresponds to approximately twice a predetermined voltage V1. The predetermined voltage V1 is a reference value of each of the output voltages Va and Vb (intermediate value of the values that the output voltages Va and Vb can range). Thus, when the total value Vab of the output voltages Va and Vb having such relationship exceeds an appropriate range (V2±α, "α" is an error margin), it may be determined that at least any one of the sensor elements is in failure.

Then, when a failure of at least any one of the sensor elements is detected in this way, application of the assisting force is immediately stopped for fail-safe. When the failed sensor element is identified, a temporary steering torque is calculated on the basis of the output signal of the other normal sensor element to continue power assist control.

However, the failed state may be identified from only the output voltages of the individual sensor elements only when the output voltage falls within an appropriate range in which the output voltage is determined to be normal (the range indicated by the region R1) or when the output voltage falls within a range in which the output voltage is definitely determined to be abnormal (when the output voltage falls outside a predetermined output range from a lower limit V3 to an upper limit V4, that is, the range indicated by regions R2 and R3), as shown in FIG. 6. Therefore, the condition that the failed sensor element may be identified is limited (in FIG. 6, the diagonally shaded areas are unidentifiable regions). When a failure of some kind occurs in any of the sensor elements that constitute the torque sensor, mostly, assisting force is steeply and gradually decreased. This steep gradual decrease in assisting force causes a steep change in steering feeling, which may probably make a driver discomfort.

A conceivable method for solving the above problem may be, for example, a method of monitoring a variation per unit time in the output voltage of each sensor element, as described in Japanese Patent Application Publication No. 2000-185657 (JP-A-2000-185657). A variation in steering torque caused by normal steering operation intrinsically has a limit. When the output voltage of any of the sensor elements steeply varies beyond a range corresponding to the limit, it is determined that a failure has occurred in that sensor element. Then, the signal output from the other normal sensor element is used to calculate the temporary torque, thus making it possible to increase the ability to continue applying assisting force after the failure in the torque sensor is detected.

However, the condition that the output voltage of any of the sensor elements steeply varies in this way occurs only when the failure is relatively severe as in the case where the output voltage falls outside the predetermined output range. Therefore, it is difficult to identify a failed sensor element of which a small error occurs to slightly exceed the appropriate range (see FIG. 6, the range indicated by the region R1) in which the output voltage is determined to be normal.

SUMMARY OF THE INVENTION

An object of the invention is to provide an electric power steering apparatus that solves the above-described problem.

An aspect of the invention provides an electric power steering apparatus that includes: a steering force assisting device that applies assisting force for assisting steering operation to a steering system using a motor as a driving source; a torque detector that detects a steering torque transmitted via a steering shaft; and a controller that controls the steering force assisting device on the basis of the steering torque. The torque detector includes: two sensor elements that respectively have inverse output characteristics from each other; and a failure detector that detects a failure of each sensor element. The torque detector calculates the steering torque on the basis of output voltages of the two sensor elements, the output voltages being input as independent two sensor signals. When the total value of the two output voltages falls outside a predetermined appropriate range, the torque detector determines that a failure has occurred in at least one of the sensor elements. When only one of the output voltages falls outside a predetermined output range or when only one of the output voltages has steeply varied to exceed a range caused by the steering operation, the torque detector determines that a failure has occurred in the sensor element corresponding to the output voltage that falls outside the predetermined output range or has steeply varied and then calculates a temporary torque on the basis of the other one of the output voltages.

In the electric power steering apparatus according to the above aspect, when it is determined that a failure has occurred in at least one of the sensor elements, when no output voltage falls outside the output range or no steep variation in output voltage is detected, and when the directions of the steering torques converted from the output voltages are the same, the torque detector may calculate the temporary torque on the basis of the output voltages. When the temporary torque is calculated, the controller may continue to control the steering force assisting device on the basis of the temporary torque.

That is, there is an extremely low possibility that a severe failure occurs at the same time in both the two sensor elements. Thus, when no severe failure is detected from any of the sensor elements and the directions of the steering torques converted from the output voltages are the same, it may be estimated that a relatively light failure having an error in the output voltages has occurred. That is, as long as the steering direction conducted by the driver may be properly detected, irrespective of whether the magnitude is optimal, it is possible to apply the assisting force in the direction to assist steering operation. Thus, with the above configuration, it is possible to increase the ability to continue to apply the assisting force in the event of a torque sensor failure. Then, particularly, it is possible to obtain further remarkable advantageous effects when the steering torque is large. A demand for applying the assisting force is stronger when the steering torque is large than when the steering torque is small.

In the electric power steering apparatus according to the above aspect, the controller may control the steering force assisting device in order to gradually decrease assisting force applied to the steering system on the basis of the temporary torque.

That is, it is desirable that the steering torque calculated as a temporary torque after occurrence of a torque sensor failure is temporarily used only in case of emergency. In terms of this point, with the above configuration, without causing a discomfort of steering feeling, or the like, it is possible to slowly stop power assist control to smoothly secure fail-safe.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 4 is a flowchart that shows the procedural steps of torque sensor failure determination and fail-safe control after a failure is detected;

DETAILED DESCRIPTION OF EMBODIMENTS

Figure 1:
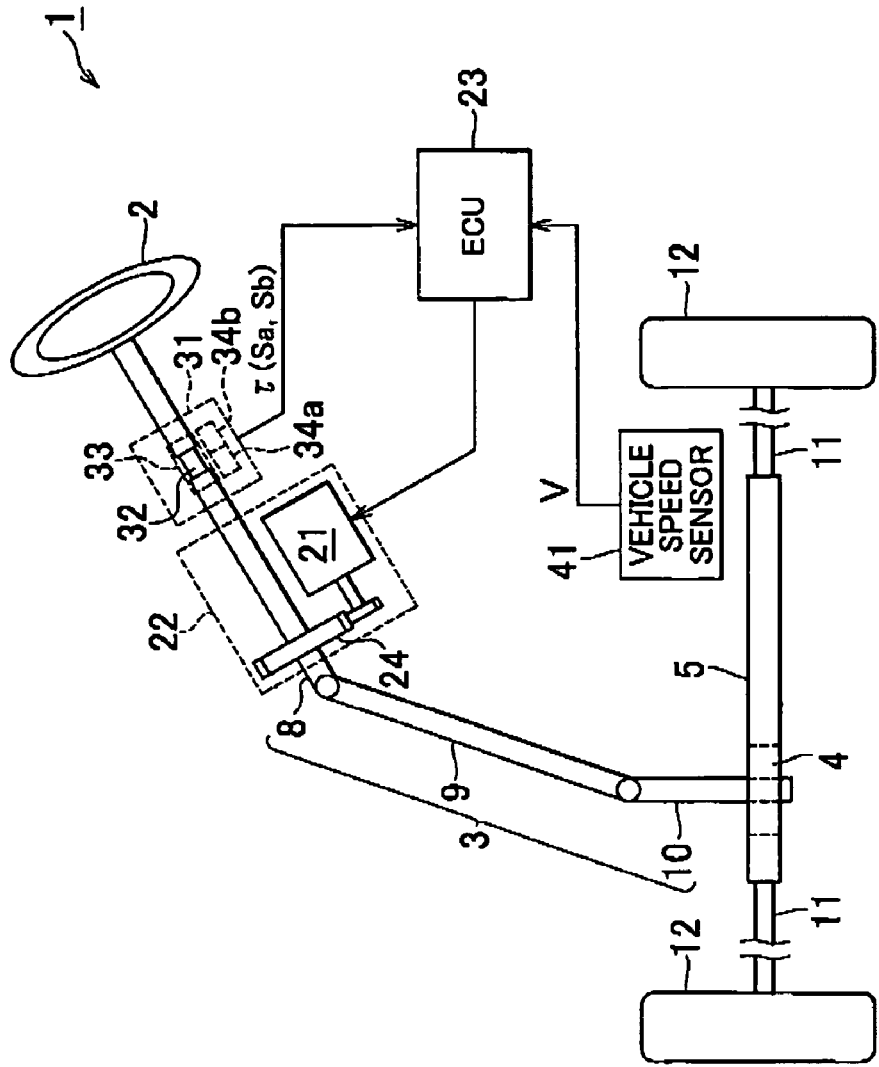
FIG. 1 is a schematic configuration diagram of an electric power steering apparatus (EPS)

Hereinafter, a specific embodiment of the invention will be described with reference to the accompanying drawings. As shown in FIG. 1, an electric power steering apparatus (EPS) 1 according to the present embodiment includes a steering shaft 3 to which a steering wheel 2 is fixed. The steering shaft 3 is coupled to a rack shaft 5 via a rack-and-pinion mechanism 4. Rotation of the steering shaft 3 resulting from steering operation is converted into linear motion of the rack shaft 5 by the rack-and-pinion mechanism 4. Note that the steering shaft 3 according to the present embodiment is formed by coupling a column shaft 8, an intermediate shaft 9 and a pinion shaft 10. Then, the linear motion of the rack shaft 5 resulting from the rotation of the steering shaft 3 is transmitted to knuckles (not shown) via tie rods 11 coupled at both ends of the rack shaft 5. This changes the steered angles of steered wheels 12, that is, the traveling direction of a vehicle.

The EPS 1 includes an EPS actuator 22 and an ECU 23. The EPS actuator 22 serves as a steering force assisting device and applies assisting force for assisting steering operation to a steering system using a motor 21 as a driving source. The ECU 23 serves as a controller and controls the EPS actuator 22.

The EPS actuator 22 according to the present embodiment is a column-type EPS actuator. The motor 21, the driving source of the EPS actuator 22, is drivably coupled to the column shaft 8 via a reduction mechanism 24. The rotation of the motor 21 is reduced by the reduction mechanism 24 and is transmitted to the column shaft 8 to apply the motor torque to the steering system as assisting force.

A torque sensor 31 is connected to the ECU 23. Specifically, the torque sensor 31 according to the present embodiment includes a torsion bar 32, a magnet 33 and Hall ICs 34a and 34b. The torsion bar 32 is provided in the middle of the column shaft 8. The magnet 33 is provided near the torsion bar 32. The Hall ICs 34a and 34b serve as sensor elements.

As a torque is input to the steering shaft 3 that is a rotary shaft, the torsion bar 32 provided for the column shaft 8 has a torsional angle based on the input torque. This causes the magnetic field of the magnet 33 to change. Then, the torque sensor 31 according to the present embodiment outputs the output voltages of the Hall ICs 34a and 34b to the ECU 23 as output signals Sa and Sb. The output voltages of the Hall ICs 34a and 34b vary with the change in the magnetic field, that is, the torque (steering torque $\tau$) input to the steering shaft 3.

Figure 2:
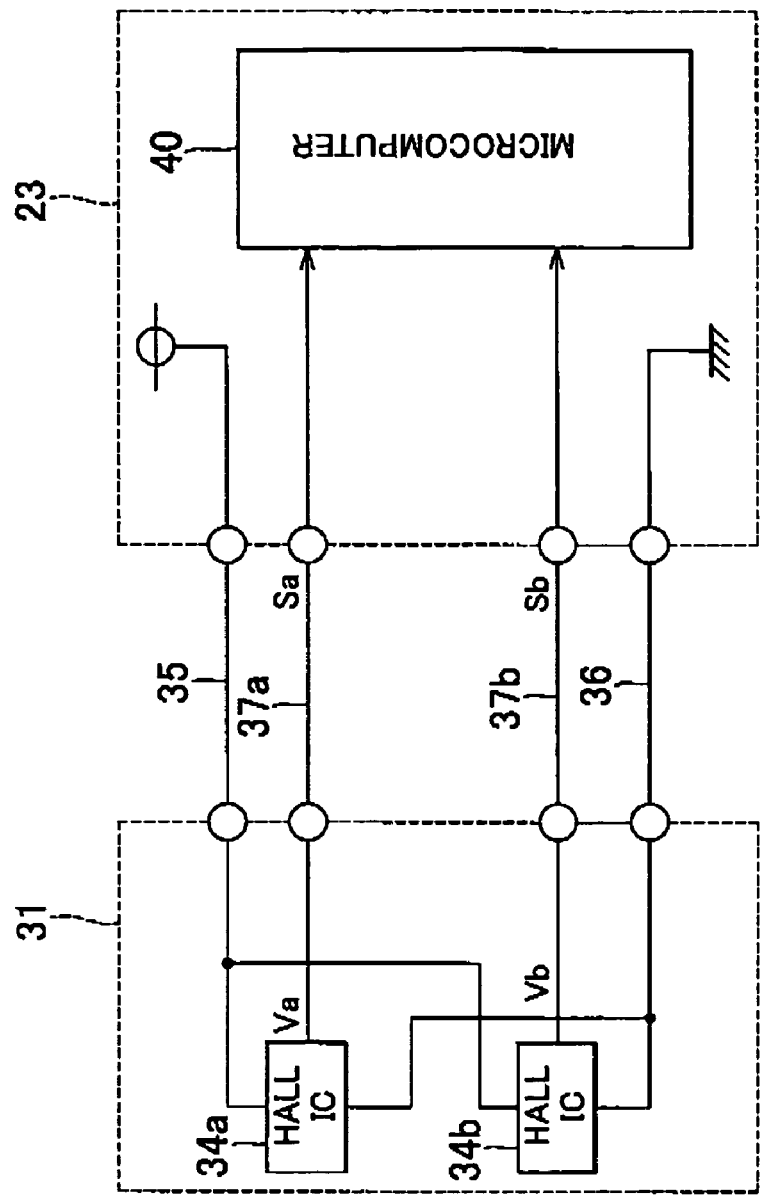
FIG. 2 is a schematic configuration diagram that shows a state where a torque sensor is connected to an ECU.

More specifically, as shown in FIG. 2, in the present embodiment, the torque sensor 31 as a sensor unit is connected to the ECU 23 as a calculation unit via power source lines 35 and 36 and signal lines 37a and 37b. The two Hall ICs 34a and 34b of the torque sensor 31 both are driven by electric power supplied from the ECU 23 via the power source lines 35 and 36. Then, the output voltages Va and Vb of the Hall ICs 34a and 34b are input to the ECU 23 via the respective signal lines 37a and 37b as independent two output signals Sa and Sb. The signal lines 37a and 37b are provided separately in correspondence with the Hall ICs 34a and 34b.

On the other hand, the ECU 23 includes a microcomputer 40 that serves as a torque detector and a failure detector. The output signals Sa and Sb of the Hall ICs 34a and 34b input to the ECU 23 are input to the microcomputer 40. Then, the microcomputer 40 calculates a steering torque $\tau$ input to the steering shaft 3 and executes failure detection on the Hall ICs 34a and 34b on the basis of the levels of the output signals Sa and Sb input thereto, that is, the output voltages Va and Vb of the Hall ICs 34a and 34b. Note that, in the present embodiment, the function of the ECU 23 as the controller is also ensured through power assist control executed by the microcomputer 40.

In addition, a vehicle speed sensor 41 is connected to the ECU 23. The ECU 23 calculates a target assisting force on the basis of the detected vehicle speed V and the steering torque $\tau$. Specifically, the ECU 23 increases a target assisting force as the absolute value of the steering torque $\tau$ increases or as the vehicle speed V decreases. Then, in order to cause the EPS actuator 22 to generate the target assisting force, driving electric power is supplied to the motor 21, serving as the driving source for the EPS actuator 22, to control the EPS actuator 22, that is, the assisting force applied to the steering system.

A mode of torque sensor failure determination and fail-safe control after a failure is detected in the EPS according to the present embodiment will be described.

Figure 5A:
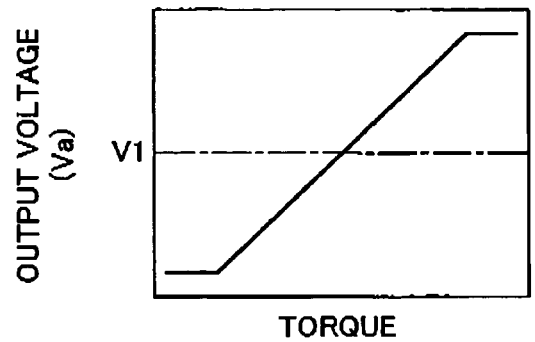
FIG. 5A is a graph that shows the variation characteristic of an output voltage of one Hall IC.
Figure 5B:
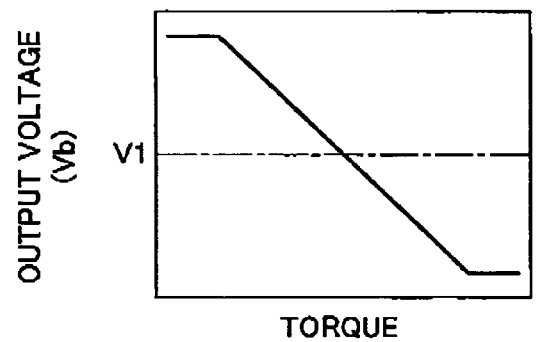
FIG. 5B is a graph that shows the variation characteristic of an output voltage of the other Hall IC.

In the present embodiment, the Hall ICs 34a and 34b that constitute the torque sensor 31 are set so that the waveforms of the output signals Sa and Sb, that is, the variation characteristics of the output voltages Va and Vb, are inverse from each other with respect to variations in input torque (see FIG. 5A and FIG. 5B). Then, the microcomputer 40 monitors the total value Vab of the output voltages Va and Vb to detect a failure in the torque sensor 31.

Figure 5C:
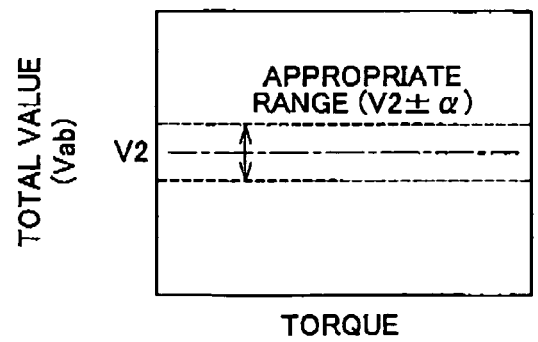
FIG. 5C is a graph that illustrates a mode of failure determination of each Hall IC.

If the waveforms of the output signals Sa and Sb, that is, the variation characteristics of the output voltages Va and Vb, of the Hall ICs 34a and 34b are inverse from each other, the total value Vab is substantially constant at a predetermined voltage V2 corresponding to the total of predetermined voltages V1 that are respective reference values of the output voltages Va and Vb (intermediate values of the values that the output voltages Va and Vb can range) (see FIG. 5C). Thus, when the total value Vab of the output voltages Va and Vb having such relationship falls outside an appropriate range (V2±α, "α" is an error margin), it indicates that any of the output voltages Va and Vb is abnormal. In such a case, the microcomputer 40 according to the present embodiment determines that a failure has occurred in any of the Hall ICs 34a and 34b.

Figure 6:
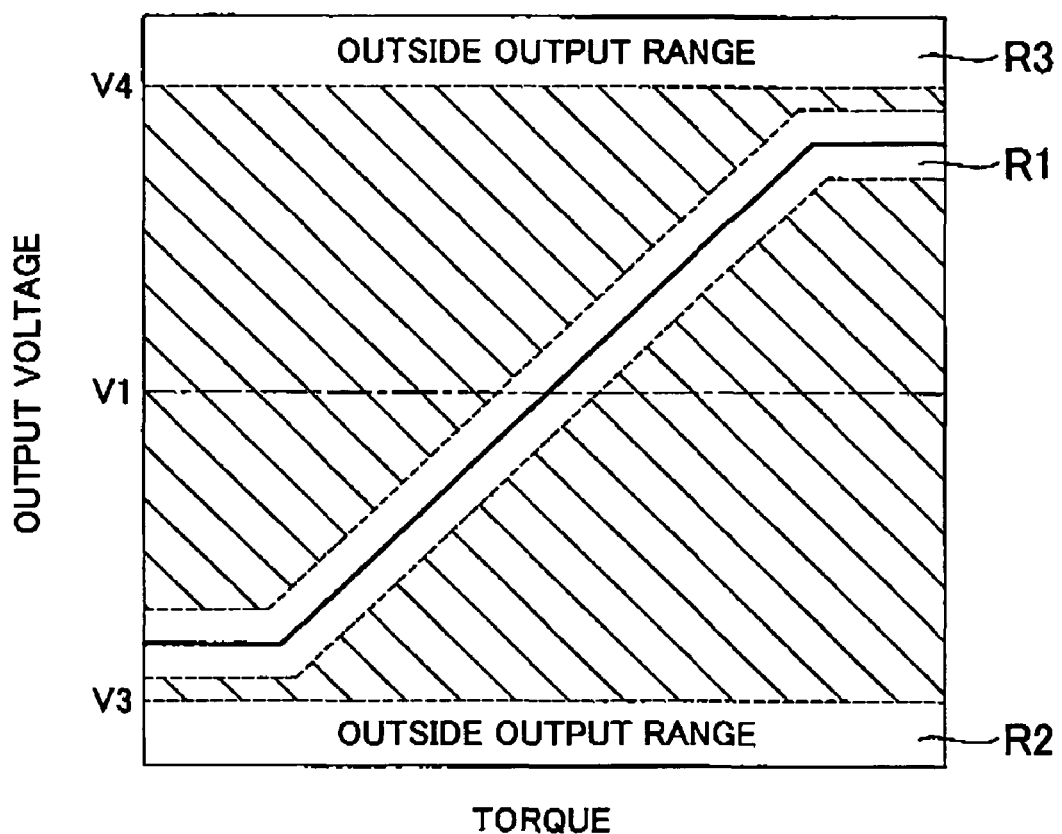
FIG. 6 is a graph that illustrates the relationship between an output voltage of a Hall IC and an identifiable failed state in failure determination according to the related art.

The microcomputer 40 according to the present embodiment determines whether the output voltage Va or Vb is a value that is definitely determined to be abnormal (falls outside a predetermined output range from a lower limit V3 to an upper limit V4) (see FIG. 6) and whether a steep variation in the output voltage Va or Vb has occurred. The "steep variation" in this case indicates a case where a variation (absolute value) per unit time of the output voltage Va or Vb exceeds a predetermined threshold. The threshold is set at a limit value (a value that is obtained by multiplying a human steering speed limit by the spring constant of the torsion bar, for example, about 3.41 N/mS) of the variation in steering torque that can be generated through steering operation. Then, when any of the output voltages Va and Vb falls outside the predetermined output range or has steeply varied, it is determined that abnormality has occurred in the Hall IC of which the output voltage falls outside the predetermined range or has steeply varied.

When it is determined that a failure has occurred in any of the Hall ICs 34a and 34b in this way and then the failed Hall IC is identified through determination as to whether the output voltage Va or Vb falls outside the output range or whether the output voltage Va or Vb has steeply varied, the microcomputer 40 according to the present embodiment uses the output voltage of the normal Hall IC to calculate the steering torque τ. For the sake of convenience of description, hereinafter, the steering torque τ that is temporarily calculated after a failure of any of the Hall ICs 34a and 34b is detected in this way is termed temporary torque.

When the failed Hall IC cannot be identified through determination as to whether the output voltage Va or Vb falls outside the output range or whether the output voltage Va or Vb has steeply varied, the microcomputer 40 according to the present embodiment further determines whether the directions of the steering torques τ converted from the output voltages Va and Vb are the same. When the directions of the steering torques converted from the two output voltages Va and Vb are the same, the temporary torque is calculated on the basis of these output voltages Va and Vb. Note that, in the present embodiment, the average of these output voltages Va and Vb is used to calculate the temporary torque.

When the temporary torque is calculated, the ECU 23 (microcomputer 40) according to the present embodiment controls the EPS actuator 22 to continue the power assist control, specifically, to slowly and gradually decrease the assisting force applied to the steering system, on the basis of the temporary torque. Then, when it is determined that a failure has occurred in any of the Hall ICs 34a and 34b and then it is determined that assist control cannot be continued through the above determinations, the assisting force applied to the steering system is steeply and gradually decreased to stop the power assist control, thus promptly securing fail-safe.

Figure 3:
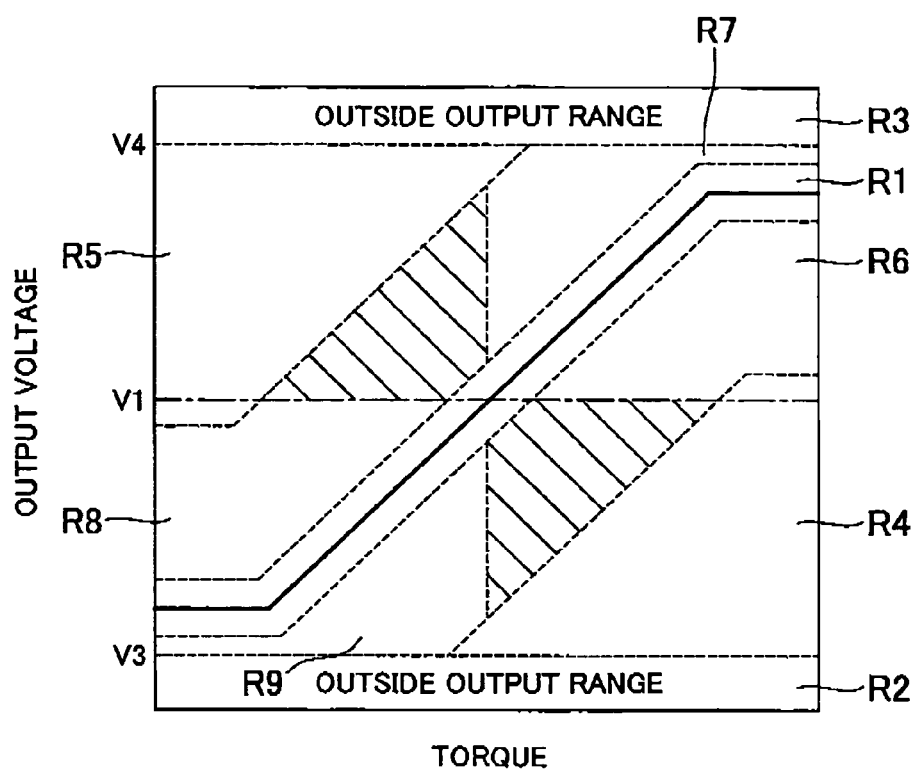
FIG. 3 is a graph that shows the relationship between an output voltage of a Hall IC and an identifiable failed state in failure determination according to an embodiment.

That is, as shown in FIG. 3, according to the existing failure determination method, a failed state of any of the Hall ICs 34a and 34b is identified when the output voltage Va or Vb falls within the following range. Note that FIG. 3 is a graph that shows the relationship between the failed state and the output characteristic of the Hall IC 34a as an example. On the other hand, the Hall IC 34b is set so that the output characteristic is inverse from that of the Hall IC 34a as described above; however, hereinafter, for the sake of convenience of description, the details of failure determination will be described only for the Hall IC 34a shown in FIG. 3.

The output voltage falls within an appropriate range that is determined to be normal (range indicated by the region R1 in FIG. 3).

The output voltage falls within a range that is definitely determined to be abnormal (range that falls outside the predetermined range from the lower limit V3 to the upper limit V4 and that is indicated by the regions R2 and R3 in FIG. 3).

A variation (absolute value) per unit time in the output voltage exceeds a predetermined threshold (range indicated by the regions R4 and R5 in FIG. 3).

However, as described above, the failed states indicated by the regions R2 to R5 are only the cases where the failure is relatively severe. Therefore, it is difficult to identify a failed sensor element of which a small error occurs to slightly exceeds the appropriate range indicated by the region R1. Therefore, an increase in the ability to continue the power assist control is also limited.

In consideration of this point, in the present embodiment, when the directions of the steering torques converted from the output voltages Va and Vb as described above are the same, the temporary torque is calculated on the basis of these output voltages Va and Vb.

There is an extremely low possibility that a severe failure occurs at the same time in both the two Hall ICs 34a and 34b. Thus, when the directions of the steering torques converted from the output voltages Va and Vb are the same, it may be estimated that a relatively light failure having an error in the output voltages has occurred (see FIG. 3, the range indicated by the regions R6 to R9).

In the present embodiment, when the steering direction may be properly detected, the average of the output voltages Va and Vb is used to temporarily calculate the steering torque even when the output voltages have an error. Then, power assist control is executed on the basis of the temporary torque to increase the ability to continue the power assist control in the event of a torque sensor failure.

Next, the procedural steps of torque sensor failure determination and fail-safe control after a failure is detected according to the present embodiment will be described. As shown in the flowchart in FIG. 4, the microcomputer 40 initially determines whether the total value Vab of the output voltages Va and Vb of the Hall ICs 34a and 34b falls outside the appropriate range, that is, whether a difference between the output voltages is excessive to thereby determine whether a failure has occurred in at least one of the Hall ICs 34*a* and 34*b* (see FIG. 5C, and step 101).

In step 101, when it is determined that a failure has occurred in at least any one of the Hall ICs 34*a* and 34*b* because of the excessive difference between the output voltages (YES in step 101), the microcomputer 40 determines whether any of the output voltages Va and Vb falls outside the predetermined output range (step 102). In step 102, when each of the output voltages Va and Vb falls within the predetermined output range (NO in step 102), it is further determined whether any of the output voltages Va and Vb has steeply varied (step 103).

When it is determined in step 102 that at least one of the output voltages Va and Vb falls outside the predetermined output range (YES in step 102), or when it is determined in step 103 that at least one of the output voltages Va and Vb has steeply varied (YES in step 103), it is determined whether only one of the output voltages Va and Vb falls outside the output range or whether only one of the output voltages Va and Vb has steeply varied (step 104).

When it is determined in step 104 that only one of the output voltages Va and Vb falls outside the output range or has steeply varied (YES in step 104), it is identified that a failure has occurred in the Hall IC that corresponds to the abnormal output voltage from which abnormality is detected, and then the output voltage of the other normal Hall IC is used to calculate the temporary torque. Then, the ECU 23 (microcomputer 40) controls the EPS actuator 22 in order to continue power assist control specifically, to slowly and gradually decrease the assisting force applied to the steering system, on the basis of the temporary torque (step 105).

On the other hand, when none of the output voltages Va and Vb has steeply varied in step 103 (NO in step 103), that is, when no failed Hall IC can be identified in step 102 or step 103, the microcomputer 40 determines whether the directions of the steering torques converted from the output voltages Va and Vb are the same (step 106). When the directions of the converted steering torques are the same (YES in step 106), the average of these output voltages Va and Vb is used to calculate the temporary torque. The EPS actuator 22 is controlled to continue the power assist control specifically, to slowly and gradually decrease the assisting force applied to the steering system, on the basis of the temporary torque (step 107).

When it is determined in step 104 that both the output voltages Va and Vb fall outside the predetermined output range or have steeply varied (NO in step 104) or when it is determined in step 106 that the directions of the steering torques converted from the output voltages Va and Vb are different (NO in step 106), the assisting force applied to the steering system is steeply and gradually decreased to stop the power assist control (step 108).

Note that when it is determined in step 101 that the total value Vab of the output voltages Va and Vb of the Hall ICs 34*a* and 34*b* falls within the appropriate range, the difference in output voltages is not excessive (NO in step 101), normal steering torque calculation and power assist control are executed (step 109).

According to the present embodiment, the following functions and advantages may be obtained. When no failed Hall IC can be identified (NO in step 103) through determination as to whether any of the output voltages Va and Vb falls outside the predetermined output range (step 102) and determination as to whether any of the output voltages Va and Vb has steeply varied (step 103), the microcomputer 40 determines whether the directions of the steering torques converted from the output voltages Va and Vb are the same (step 106). Then, when the directions of the converted steering torques are the same, the average of these output voltages Va and Vb is used to calculate the temporary torque, and then the EPS actuator 22 is controlled to continue the power assist control, that is, specifically, to slowly and gradually decrease the assisting force applied to the steering system, on the basis of the temporary torque (step 107).

That is, there is an extremely low possibility that a severe failure occurs at the same time in both the two Hall ICs 34*a* and 34*b*. Thus, when the directions of the steering torques converted from the output voltages Va and Vb are the same, it may be estimated that a relatively light failure having an error in the output voltages has occurred.

As long as the steering direction conducted by the driver may be properly detected, irrespective of whether the magnitude is optimal, it is possible to apply the assisting force in the direction to assist steering operation. With the above configuration, it is possible to increase the ability to continue to apply the assisting force in the event of a torque sensor failure. When it is determined that it is difficult to continue assist control even with the above failure check, the original steering torque is small. That is, it is possible to obtain further remarkable advantageous effects when the steering torque is large. A demand for applying assisting force is stronger when the steering torque is large than when the steering torque is small.

Note that the present embodiment may be modified into the following alternative embodiments.

In the present embodiment, when the directions of the steering torques converted from the output voltages Va and Vb are the same, the average of the output voltages Va and Vb is used to calculate the temporary torque. However, the aspect of the invention is not limited to this configuration. It is also applicable that the smaller one of the output voltages Va and Vb (absolute values) is used to calculate the temporary torque. That is, as long as an error has occurred in any of the output voltages Va and Vb, it is difficult to understand that the applied assisting force has an optimal magnitude. Thus, the assisting force applied to the steering system is decreased so as to reduce the influence of that error. Hence, it is possible to alleviate discomfort of the driver.

In the present embodiment, the aspect of the invention is embodied in failure detection of the torque sensor 31; however, as long as output signals are duplexed similarly, the aspect of the invention may be applied to failure detection of, for example, a rotation angle sensor, or the like.

In the present embodiment, the assisting force applied to the steering system is slowly and gradually decreased when power assist control is continued after occurrence of a torque sensor failure; however, the aspect of the invention may be embodied in a configuration that the above gradual decrease in assisting force is not carried out.

What is claimed is:

1. An electric power steering apparatus comprising:
   a steering force assisting device that applies assisting force for assisting steering operation to a steering system using a motor as a driving source;
   a torque detector that detects a steering torque transmitted via a steering shaft; and
   a controller that controls the steering force assisting device on the basis of the steering torque, wherein
   the torque detector includes
   two sensor elements that respectively have inverse output characteristics from each other; and
   a failure detector that detects a failure of each sensor element, wherein the torque detector calculates the steering torque on the basis of output voltages of the two sensor elements, the output voltages being input as two independent sensor signals, when the total value of the two output voltages falls outside a predetermined range, the torque detector determines that a failure has occurred in at least one of the sensor elements, the torque detector determines if either one of the output voltages falls outside a predetermined output range, if the torque detector determines that both of the output voltages do not fall outside the predetermined output range, then the torque detector determines if either one of the output voltages has steeply varied over time to exceed a range caused by the steering operation, and the torque detector determines that a failure has occurred in the respective one of the sensor elements corresponding to either one of the output voltages determined to fall outside the predetermined output range or determined to steeply vary over time, and then the torque detector calculates a temporary torque on the basis of the other one of the output voltages.

2. The electric power steering apparatus according to claim 1, wherein when it is determined that a failure has occurred in at least one of the sensor elements, when no output voltage falls outside the output range and no steep variation over time in the output voltage is detected, and when the directions of the steering torques converted from the output voltages are the same, the torque detector calculates the temporary torque on the basis of the output voltages, and when the temporary torque is calculated, the controller continues to control the steering force assisting device on the basis of the temporary torque.

3. The electric power steering apparatus according to claim 2, wherein the controller controls the steering force assisting device in order to gradually decrease assisting force applied to the steering system on the basis of the temporary torque.

* * * * *